Patented Nov. 5, 1935

2,019,756

UNITED STATES PATENT OFFICE 2,019,756

PROCESS OF PREVENTING POCKMARKING OF DRESSED POULTRY

Daniel E. Knowlton and Gilbert G. Early, Jr., Buffalo, N. Y., assignors to Buffalo Cold Storage Company, Buffalo, N. Y., a corporation of New York No Drawing. Application September 15, 1934, Serial No. 744,265

5 Claims. (Cl. 99—14)

This invention relates to a process for preventing the "pockmarking" of dressed poultry or fowls by or during the cold storage thereof. "Pockmarking" is a term employed to designate a surface spotting of dressed poultry resembling pockmarks. These spots are also known as "freezer burns." As used in this specification, the word "poultry" is intended to include all kinds of fowls which are marketed for human consumption.

Pockmarking frequently occurs in cold storage poultry, due to the fact that the low temperatures and dry atmospheric conditions to which the poultry is subjected in cold storage act to dry out or evaporate the natural juices or moisture from the skin or surface portions of the carcasses at or around the holes in the skin from which the feathers have been plucked. Freshly dressed poultry does not have this objectionable pockmarked appearance and, therefore, the pockmarking, while not affecting the edibility or food value of the poultry, is nevertheless an objection which, on account of appearance, results in the necessity for selling the pockmarked poultry at a reduced price.

The object of our invention is to prevent such "pockmarking".

All dressed poultry, whether dry picked, or picked by the so-called semi-scalding, full scalding or other methods, will show pockmarking. The semi-scalding method of dressing poultry, because of economical and other considerations, is the one most universally adopted by the large poultry packers. In this method, the birds are immersed thirty seconds to a minute in hot or scalding water of a temperature depending upon the age and size of the birds. Then the poultry is rough-picked, that is, the large feathers are removed without any attempt to completely remove all of the small or pin feathers. To remove the latter and produce a cleaner dressing, the birds are dipped in a melted paraffin or wax composition which, when the birds are removed from this bath, cools and forms solidified or hard coatings on the carcasses. Then, this coating is broken or peeled off and the pin feathers which adhere thereto, are thus removed. When the coating is removed, it leaves the holes in the skins from which the feathers have been removed open, and thus encourages loss of moisture and juices, due to evaporation during cold storage. The removal of this coating also produces a pulling action on the skin which stretches the holes out of their natural shape or condition and prevents them from closing tightly, no matter how subsequently treated by previously used methods. Some packers or producers, in an attempt to improve the appearance of the poultry dressed by this semi-scalding method, have followed the practice of dipping the poultry in either cold or hot water for from five to ten minutes to "plump" the poultry and add water to offset the loss of moisture or drying out thereof during cold storage, but this does not prevent pockmarking.

Another object of our invention is to provide a practical, economical and efficient process for treating dressed poultry, by whatever method it may be dressed to prevent it from becoming pockmarked by the cold storage thereof.

This is accomplished by filling, closing or sealing the skin holes from which the feathers have been removed with any suitable substance or material which will act to prevent evaporation of moisture or natural juices therefrom during the cold storage of the poultry. The process must be economical to be commercially practical and the coating material should be a substance that is edible and not harmful to health in order to comply with the pure food laws, and it should be such that it readily fills or closes the feather holes and forms an unbroken film over each carcass, which will prevent evaporation or desiccation. Preferably, also the coating substance should be water soluble so that it will be readily removed by washing the poultry in preparing it for cooking, or by the natural sweating of the poultry which occurs when the poultry is exposed to ordinary atmospheric conditions after removal from the cold storage house. The coating substance or material which we have found to best fulfill these requirements and which we now consider the most suitable for the purpose is a solution of glycerine and water. Glycerine, due to its hygroscopic nature, will take on water rather than evaporate it. In solution, it will remain liquid at the lowest temperatures used in commercial freezing or cold storage; it is not harmful to the human system and it is soluble in water in all proportions. Due to the phenomenon of osmosis, glycerine can be removed from a substance containing it merely by immersing the substance in water.

The following table shows the freezing points of different glycerine and water solutions.

| Percent glycerine by weight | Freezing point of— |
|---|---|
| | °F. |
| 40 | +4.3 |
| 50 | −9.4 |
| 60 | −30.5 |
| 70 | −38.0 |
| 80 | −5.5 |
| 90 | +29.1 |

While commercial glycerine, which comes as an 80 percent solution of glycerine and water, can be used without dilution for the coating solution in this process, it will be observed from the above table that glycerine of this concentration has a higher freezing point than a glycerine and water solution having a greater proportion of water. It is, therefore, preferred to use a glycerine and water solution having more water both for economical reasons and also in order to lower the freezing point of the solution below the lowest temperatures used in the commercial freezing or cold storage of food stuffs.

The solution preferably employed for coating the poultry contains from about 60 to 70 percent of glycerine by weight, since such concentrations have the desired freezing points and are economical. The water in the solution satisfies the affinity of glycerine for moisture and prevents removal of moisture from the poultry to an objectionable extent, but the concentrations should not go much below about 60 percent glycerine, for at lower temperatures there is an increased tendency for such weaker solutions to evaporate or dry.

The coating can be applied to the poultry either by dipping the poultry in the solution or by spraying the solution on the poultry. In cases where the dressed poultry is immersed in water to plump it, as before mentioned in connection with the semi-scalding method of picking, the coating solution of glycerine and water can be substituted in place of the cold or hot water bath heretofore used, and this will avoid the further labor and expense of dipping or spraying the poultry to apply the coating solution in addition to the plumping immersion. Unless it is desired to thus immerse the dressed poultry for the purpose of plumping it, the spray method of applying the solution for coating the poultry is preferred, since it is more economical than dipping the poultry in the solution. When dressed poultry which has already been plumped by immersion in water is to be treated by our process, the coating is preferably applied by spraying, and in such cases a more concentrated solution, or commercial glycerine without dilution, can be employed, since the water in the poultry added by the plumping immersion will combine with the glycerine and form a coating film of suitable concentration.

Any other substance having the requisite characteristics can be used in place of the glycerine and water solutions mentioned for closing or sealing the feather holes in the skin or forming the coating according to our process. While such substitutes, for one reason or another, may be less desirable than the glycerine and water solution, nevertheless other substances are practical for preventing pockmarking. For instance, vegetable oils such as cottonseed oil or olive oil, and mineral oils, used as the coating, will fill or close the feather holes and prevent the evaporation of moisture and juices from the poultry during cold storage, which causes the pockmarking. While these materials, at first, give the poultry a greasy appearance, after a period of low temperature they begin to congeal, or dry more or less making this condition less objectionable. Such oils, however, do not have as low freezing points as the preferred glycerine and water solution and congeal or crystallize at low temperatures and, therefore, would not be as desirable for use in cases where the poultry is frozen or stored under temperatures below the congealing or freezing points of the oils.

We claim as our invention:

1. The process of treating dressed poultry to prevent the pockmarking of the skin thereof by desiccation during cold storage, which comprises forming on the dressed poultry a surface-covering film of a solution of glycerine and water adapted to seal the skin holes from which the feathers have been removed and prevent loss of moisture or natural juices through said holes during cold storage to an extent sufficient to cause such pockmarking.

2. The process of treating dressed poultry to prevent the pockmarking of the skin thereof by desiccation during cold storage, which comprises forming on the poultry a surface-covering film of a solution of glycerine and water of a concentration not exceeding about seventy percent by weight of glycerine.

3. The process of treating dressed poultry to prevent the pockmarking of the skin thereof by desiccation during cold storage, which comprises forming on the poultry a surface-covering film of a solution of glycerine and water of a concentration not less than about sixty percent by weight of glycerine.

4. The process of treating dressed poultry which comprises immersing the same in a solution of glycerine and water to plump the poultry and to form thereon a surface-film which closes the skin holes from which the feathers have been removed and thereby prevents the pockmarking of the skin by the cold storage of the poultry.

5. The process of treating dressed poultry to prevent the pockmarking of the skin thereof by desiccation during cold storage, which comprises forming on the poultry a surface covering film of a solution of glycerine and water of a concentration not less than about sixty per cent and not exceeding about seventy per cent by weight of glycerine.

DANIEL E. KNOWLTON.
GILBERT G. EARLY, JR.